US006735250B2

(12) United States Patent
Inou

(10) Patent No.: US 6,735,250 B2
(45) Date of Patent: *May 11, 2004

(54) IMAGE PROCESSING APPARATUS AND METHOD UTILIZING MOTION VECTORS

(75) Inventor: Kazuya Inou, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,504

(22) Filed: Jul. 15, 1998

(65) Prior Publication Data

US 2002/0131504 A1 Sep. 19, 2002

(30) Foreign Application Priority Data

Jul. 15, 1997 (JP) ............................................. 9-189855

(51) Int. Cl.[7] ................................................. H04N 7/24
(52) U.S. Cl. .................................. 375/240.01; 348/699
(58) Field of Search ....................... 348/207.99, 208.99, 348/208.1, 208.4, 207, 208, 222, 384, 390, 402, 407, 409, 412, 413, 416, 420, 699; 386/33, 69, 70, 111, 46, 109, 112; 375/240.01, 240.12, 240.16, 240.24; 382/232, 236, 238; H04N 7/24

(56) References Cited

U.S. PATENT DOCUMENTS

| 5,136,376 | A | * | 8/1992 | Yagasaki et al. ............ 348/409 |
| 5,196,933 | A | * | 3/1993 | Henot ........................ 348/420 |
| 5,237,405 | A | * | 8/1993 | Egusa et al. ............. 348/208.1 |
| 5,347,371 | A | * | 9/1994 | Nishimura et al. ......... 348/222 |
| 5,371,539 | A | * | 12/1994 | Okino et al. ................ 348/208 |
| 5,614,945 | A | * | 3/1997 | Sekine et al. ............... 348/699 |
| 5,619,595 | A | * | 4/1997 | Naito ........................ 348/407 |
| 5,706,054 | A | * | 1/1998 | Hannah ..................... 348/402 |
| 5,978,029 | A | * | 11/1999 | Boice et al. ................ 348/412 |
| 6,038,364 | A | * | 3/2000 | Koyama et al. .............. 386/46 |
| 6,040,861 | A | * | 3/2000 | Boroczky et al. ........... 348/409 |
| 6,049,354 | A | * | 4/2000 | Sekine et al. ............... 348/208 |

FOREIGN PATENT DOCUMENTS

JP    06-65181    6/1994    ............ H04N/7/18

* cited by examiner

Primary Examiner—Richard Lee
(74) Attorney, Agent, or Firm—Fitzpatrick, Cella, Harper & Scinto

(57) ABSTRACT

An image signal is input to an image processor for precessing, and motion vectors of an object in the input image signal are detected. A motion vector from among the detected motion vectors is identified which satisfies a predetermined condition, and predetermined processing is performed on the input image signal in accordance with the identification result. An image processing program is recorded on a computer readable recording medium for execution by the image processor to perform the predetermined processing.

9 Claims, 12 Drawing Sheets

START OF MULTIPLE
PICTURE FRAMES

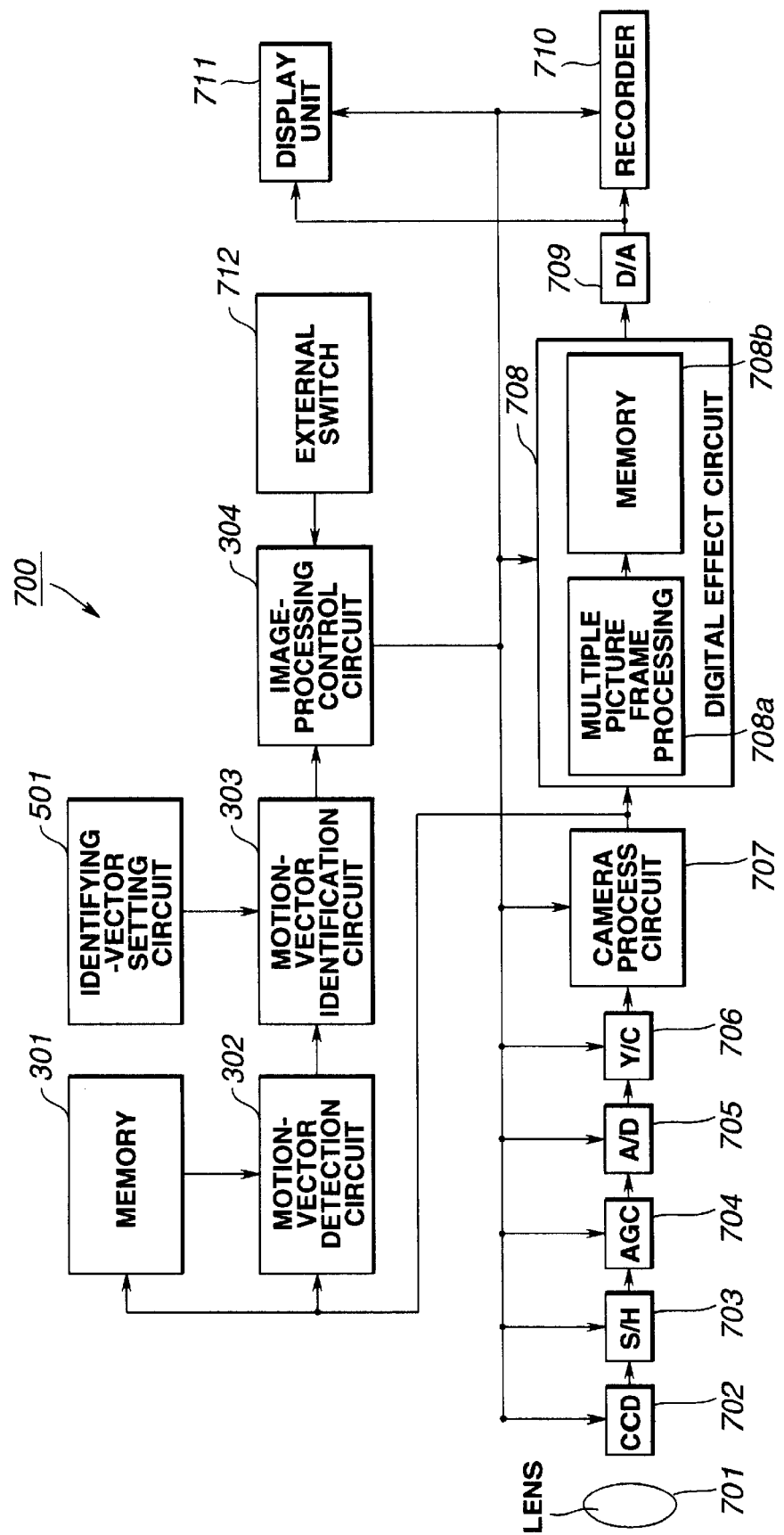

IMAGE PROCESSING APPARATUS AND METHOD UTILIZING MOTION VECTORS

BACKGROUND OF THE INVENTION

1. Field of the Invention

The present invention relates to an image processing apparatus and method in which motion vectors are detected from input image data and the image data is processed utilizing the detected motion vectors.

2. Description of the Related Art

For example, there is an image processing apparatus 100 shown in FIG. 1 as a general image processing apparatus. In image processing apparatus 100, the user instructs execution of predetermined image processing through an external switch 101.

That is, the image processing apparatus 100 includes the external switch 101 through which the user provides the image processing apparatus 100 with a command to execute predetermined image processing, an image processing circuit 103 which performs the predetermined image processing for a moving-image signal input from an input terminal 104 and outputs the resultant signal from an output terminal 105, and an image-processing control circuit 102 for controlling the execution of the predetermined image processing performed by the image processing circuit 103 in accordance with the execution command provided through the external switch 101.

The image processing apparatus 100 having the above-described configuration is generally applied to a video camera and the like.

For example, in a video camera having the configuration of the image processing apparatus 100, when a user depresses a video recording button (the external switch 101) at the moment of the start of video recording processing, an image-processing control circuit 102 within the video camera generates a video-recording start signal (an instruction of execution), so that a recorder (the image processing circuit 103) starts video recording processing (predetermined image processing) of an image to be photographed.

In Laid-Open Japanese Patent Application (Kokai) No. 6-165181 (1994), a monitor camera system is described, which has the feature that video recording processing is controlled according to the presence/absence of motion of an object to be photographed. This monitor camera system has a configuration 200 shown in FIG. 2.

That is, this monitor camera system includes a memory 201 for storing the motion of an object to be photographed in a moving-image signal input from an input terminal 205, a detection circuit 202 for detecting the presence/absence of a motion from motion information stored in the memory 201, and the moving-image signal currently input from the input terminal 205, an image processing circuit 204 for performing predetermined image processing, such as video recording processing and the like, for the moving-image signal input from the input terminal 205 and outputting the resultant signal from an output terminal 206, and an image-processing control circuit 203 for controlling the execution of the predetermined image processing in the image processing circuit 204 based on the result of detection by the motion detection circuit 202.

Accordingly, in this monitor camera system, the start and end of a video recording operation, a video-recording-time mode and the like are controlled based on motion being detected by the motion detection circuit 202.

However, in the conventional image processing apparatus 100 shown in FIG. 1, since a timing of execution of predetermined image processing is instructed through the external switch 101, it is very difficult to execute the predetermined image processing at a timing which is more precise than the response speed of the user.

For example, in the above-described conventional video camera, when it is intended to execute image processing for obtaining a special effect at a desired timing while photographing an object, the user's operation of the external switch 101 is delayed from the intended timing, so that the expected special effect cannot be obtained.

The conventional monitor camera having the configuration shown in FIG. 2 automatically performs predetermined image processing, such as video recording processing and the like, based on the presence/absence of motion of an object to be photographed. However, since such camera controls whether or not predetermined image processing is to be merely executed based on the presence/absence of motion in an object to be photographed, it is impossible to finely control the predetermined image processing.

SUMMARY OF THE INVENTION

It is an object of the present invention to solve the above-described problems.

It is another object of the present invention to provide an image processing apparatus and method in which predetermined image processing is controlled with a high function in accordance with motion of an object in an image signal, and a computer-readable recording medium storing an image processing program for such an apparatus and method.

According to one aspect, the present invention which achieves these objectives relates to an image processing apparatus including input means for inputting an image signal, detection means for detecting motion vectors of an object from the image signal input by the input means, identification means for identifying a motion vector which satisfies a predetermined condition from among the motion vectors detected by the detection means, and image processing means for performing predetermined processing of the image signal in accordance with an output from the identification means.

According to another aspect, the present invention which achieves these objectives relates to an image processing method including the steps of inputting an image signal, detecting motion vectors of an object from the input image signal, identifying a motion vector which satisfies a predetermined condition from among the detected motion vectors, and performing predetermined processing of the image signal in accordance with a result of the identification.

According to still another aspect, the present invention which achieves these objectives relates to a computer readable recording medium in which an image processing program is recorded. The recording medium includes program codes of an input step of inputting an image signal, a detection step of detecting motion vectors of an object from the image signal input in the input step, an identification step of identifying a motion vector which satisfies a predetermined condition from among the motion vectors detected in the detection step, and an image processing step of performing predetermined processing of the image signal in accordance with a result of the identification.

Other objects, features and advantages of the invention will become apparent from the following detailed description taken in conjunction with the accompanying drawings.

BRIEF DESCRIPTION OF THE DRAWINGS

FIG. 10 is a block diagram illustrating the configuration of a video camera according to a fourth embodiment of the present invention;

DETAILED DESCRIPTION OF THE PREFERRED EMBODIMENTS

Preferred embodiments of the present invention are described with reference to the drawings.

First Embodiment

First, a description is provided of a first embodiment of the present invention.

Figure 1:
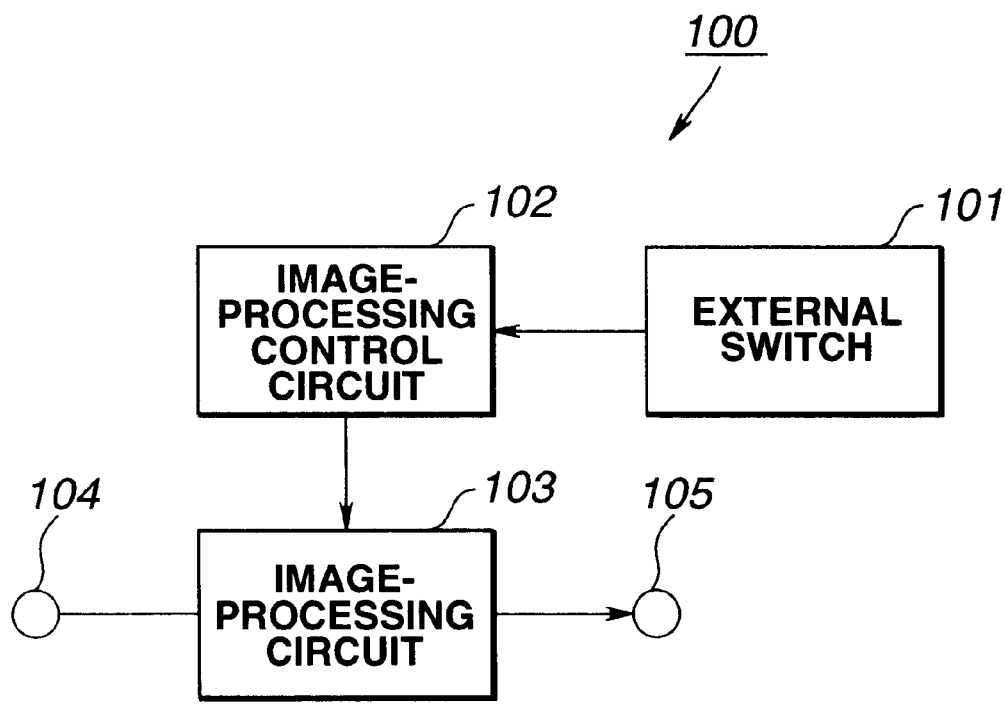
FIG. 1 is a block diagram illustrating the configuration of a conventional image processing apparatus.
Figure 2:
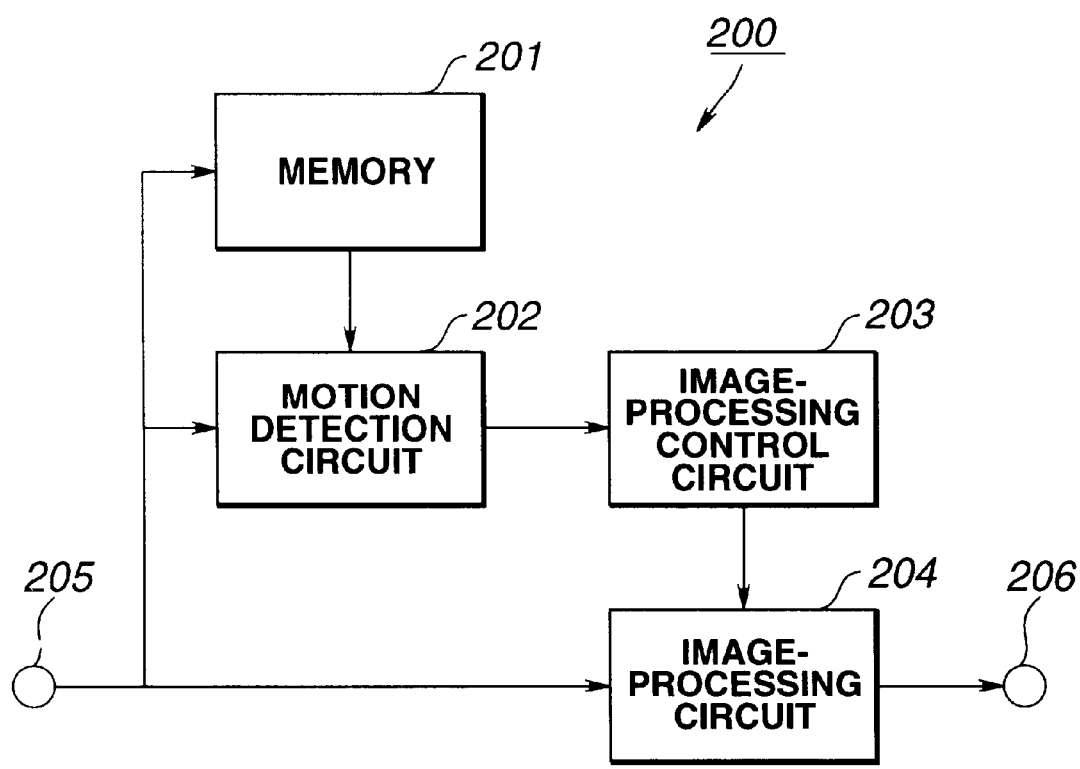
FIG. 2 is a block diagram illustrating the configuration of a conventional monitor camera system.
Figure 3:
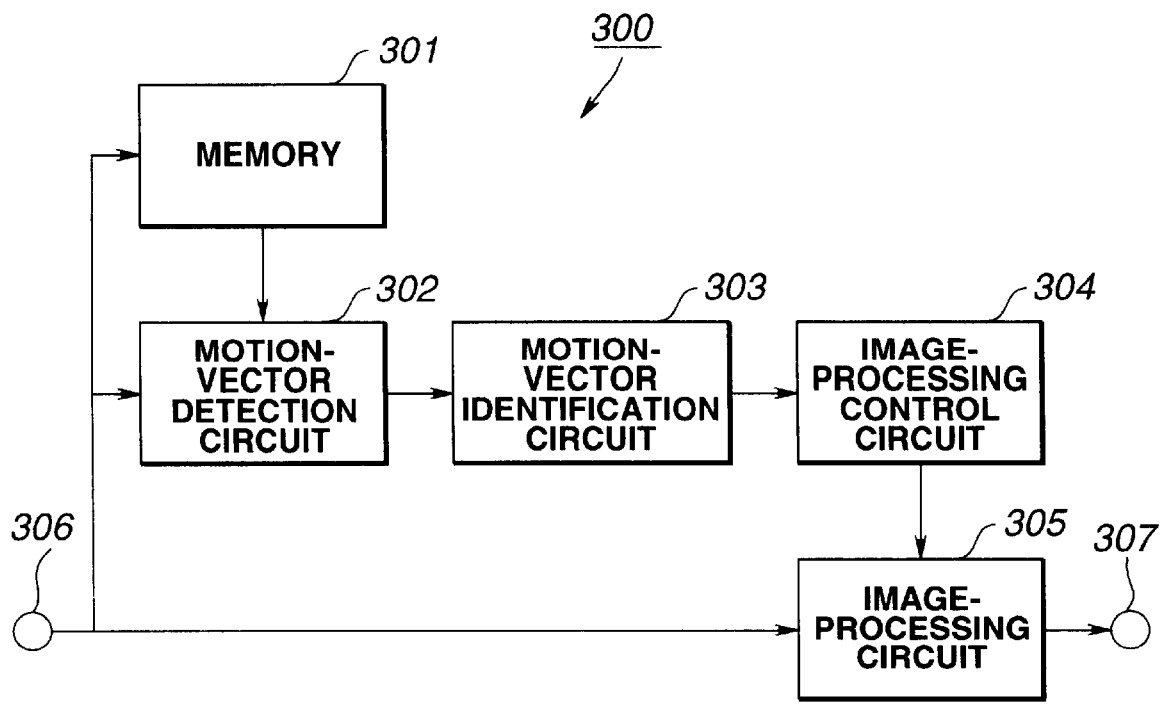
FIG. 3 is a block diagram illustrating the configuration of an image processing apparatus according to a first embodiment of the present invention.

FIG. 3 is a block diagram illustrating the configuration of an image processing apparatus 300 according to the first embodiment.

In FIG. 3, the image processing apparatus 300 includes a memory 301 and a motion-vector detection circuit 302 where a moving-image signal from an input terminal 306 is supplied, a motion-vector identification circuit 303 where the output of the motion-vector detection circuit 302 is supplied, an image-processing control circuit 304 where the output of the motion-vector identification circuit 303 is supplied, and an image processing circuit 305 where the output of the image-processing control circuit 304 is supplied. The output of the memory 301 is supplied to the motion-vector detection circuit 302.

The moving-image signal from the input terminal 306 is also supplied to the image processing circuit 305. The output of the image processing circuit 305 is output from an output terminal 307.

The memory 301 is an image memory, and stores the moving-image signal from the input terminal 306.

The motion-vector detection circuit 302 detects each motion vector, comprising the direction and the magnitude of the motion of an object in an image, from the current frame of a moving-image signal from the input terminal 306, and a previous frame of the moving-image signal stored in the memory 301.

For example, a matching method, in which a correlation value is calculated by shifting two images to be compared with each other, and the amount of shift when the result of the calculation has a maximum value is made to be a motion vector, is adopted as the motion-vector detection method used in the motion-vector detection circuit 302.

Figure 4:
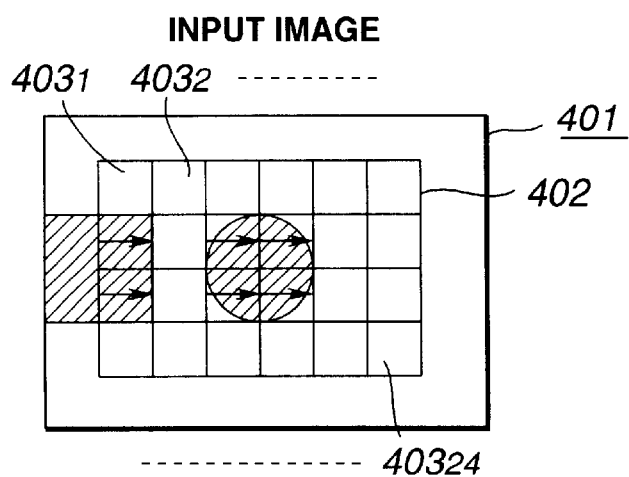
FIG. 4 is a diagram illustrating detection of motion vectors in the first embodiment.

By adopting a block matching method of dividing an image comparison region into small pixel blocks having a predetermined size, or a representative-point matching method of extracting a representative pixel from among various matching methods, for example, as shown in FIG. 4, motion vectors (indicated by arrows in FIG. 4) in a plurality of positions $403_1$, $403_2$, . . . , $403_{24}$ (hereinafter termed "detection blocks", 24 blocks comprising vertical 4 blocks× horizontal 6 blocks in FIG. 4) within a comparison region 402 of an image 401 are detected.

The motion vectors detected by the motion-vector detection circuit 302 are supplied to the motion-vector identification circuit 303.

Although details are described later, the motion-vector identification circuit 303 stores in advance a condition, such as the position, the magnitude, the direction and the like, of a motion vector to be identified (hereinafter termed an "identification condition"), determines whether or not a motion vector from the motion-vector detection circuit 302 satisfies the identification condition, and supplies the image-processing control circuit 304 with an identifying signal when the motion vector satisfies the identification condition.

When the identifying signal is supplied from the motion-vector identification circuit 303, the image-processing control circuit 304 supplies the image processing circuit 305 with a control signal indicating the start of predetermined image processing.

When the control signal from the image-processing control circuit 304 is supplied, the image processing circuit 305 performs the predetermined image processing for the moving-image signal from the input terminal 306, and outputs the resultant signal from the output terminal 307.

Figure 5:
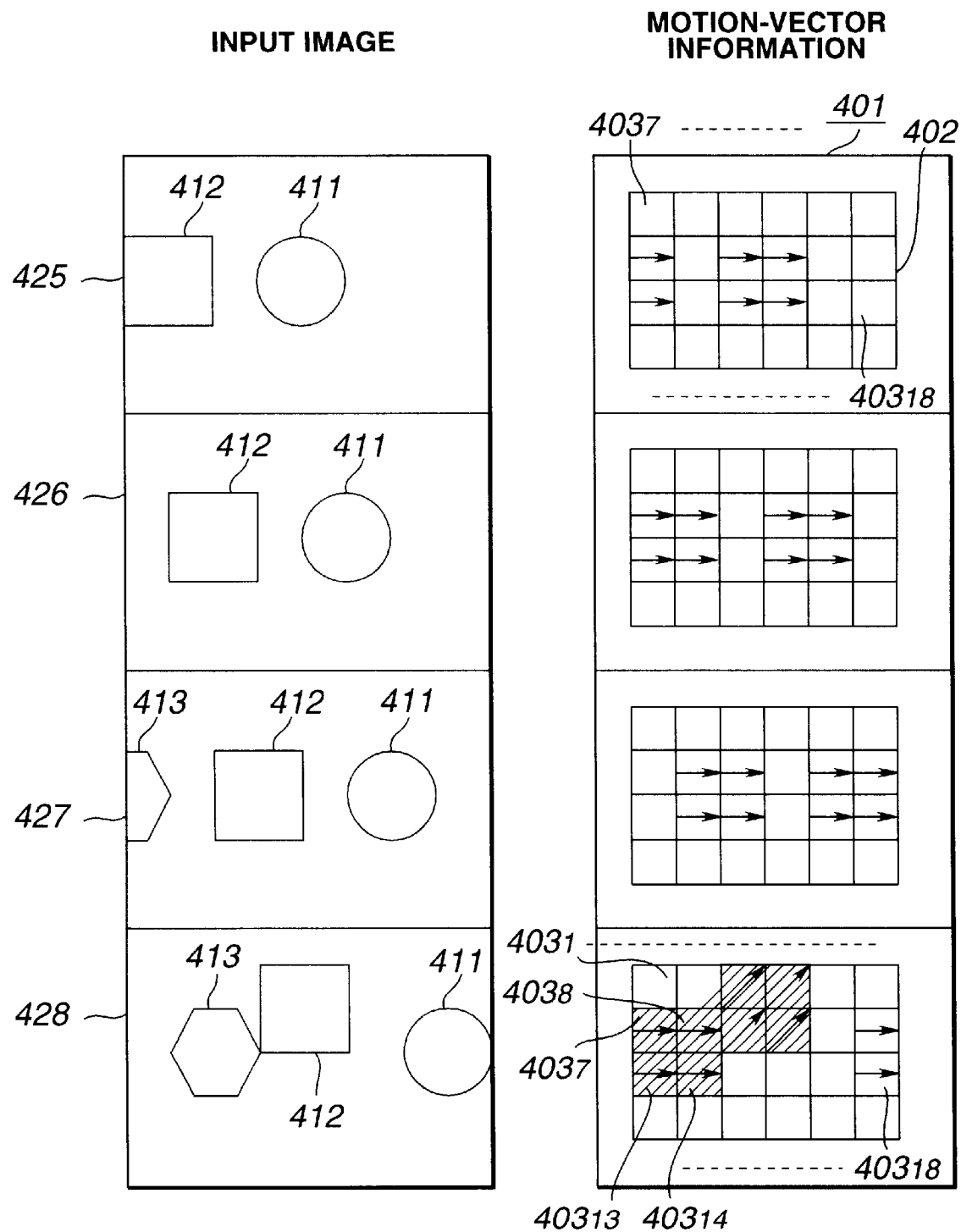
FIG. 5 is a diagram illustrating processing of identifying motion vectors in succesive picture-frames in the first embodiment.

A description follows motion vectors detected by the motion-vector detection circuit 302 and a motion vector identified by the motion-vector identification circuit 303 when, in the image processing apparatus 300, for example, as shown in FIG. 5, a plurality of objects 411, 412 and 413 moving through a central portion of each image, in successive frames 425–428, from the left to the right at a constant speed are input from the input terminal 306.

In this case, the motion-vector detection circuit 302 detects motion vectors in the image frames 425–428 shown in FIG. 5 which move toward the right at a predetermined magnitude in blocks $403_7$–$403_{18}$ in two rows other than the uppermost row and the lowermost row from among the plurality of detection blocks.

In an image shown frame 28 of in FIG. 5, motion vectors which move toward the right at a predetermined magnitude in blocks $403_1$–$403_{18}$ in three rows other than the lowermost row are detected. However, motion vectors having a magnitude larger than the predetermined magnitude are detected in blocks $403_7$, $403_8$, $403_{13}$ and $403_{14}$ corresponding to the movement of an object 413 from among the detected motion vectors.

At that time, if, for example, identification conditions stored in advance in the motion-vector identification circuit 303 are "a motion vector detected in the blocks $403_1$–$403_6$ in the uppermost row or the blocks $403_{19}$–$403_{24}$ in the lowermost row (condition 1)", "a motion vector in a direction other than the rightward direction (condition 2)", and "a motion vector having a magnitude equal to or larger than a predetermined magnitude (condition 3)", motion vectors for the image shown in frame 28 of FIG. 5 satisfy the above-described conditions 1 and 3. In such a case, an identifying signal is supplied from the motion-vector identification circuit 303 to the image-processing control circuit 304 at the timing when the image shown in frame 28 of FIG. 5 is input.

If an object moving to the left is present in an input image, the condition 2 is satisfied. In such a case, an identifying signal is also supplied from the motion-vector identification circuit 303 to the image-processing control circuit 304 at the timing when such an image is input.

As described above, in the first embodiment, not only by utilizing presence/absence of the movement of an input image, but also by identifying a motion vector in an input image with fine identification conditions, such as the above-described conditions 1–3, and utilizing the identified motion vector so as to control execution of predetermined image processing in the image processing circuit 305, i.e., utilizing the motion vector as a switch for image processing, it is possible to execute the predetermined image processing at a precise timing, and to finely control the predetermined image processing.

Second Embodiment

Next, a second embodiment of the present invention is described.

Figure 6:
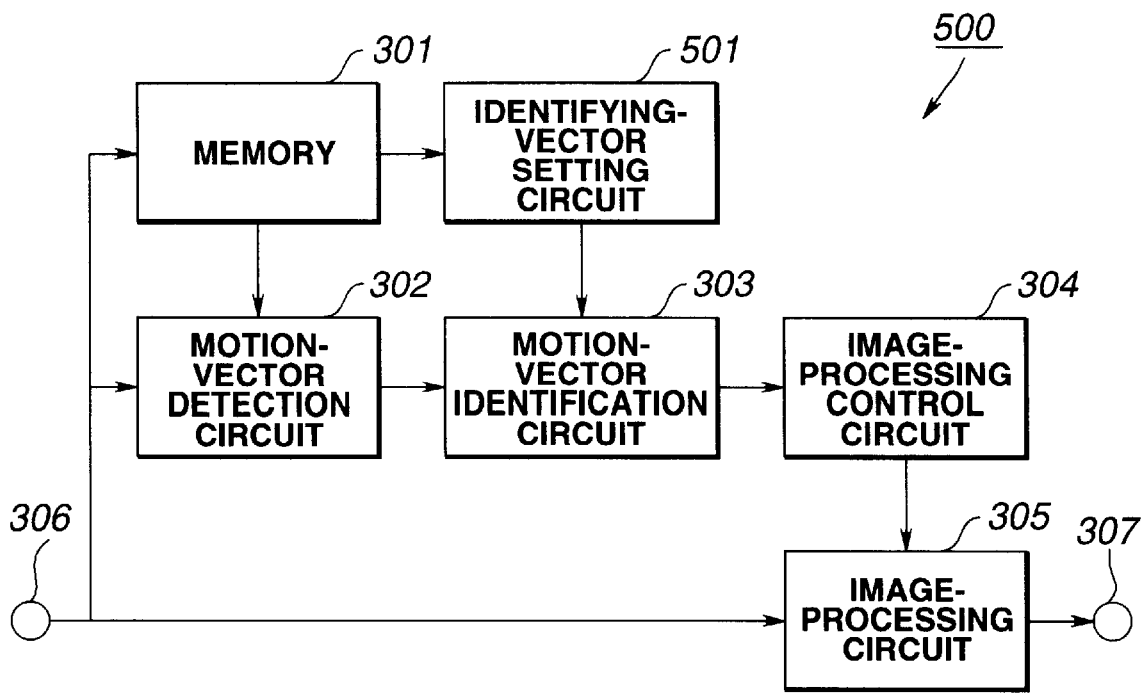
FIG. 6 is a block diagram illustrating the configuration of an image processing apparatus according to a second embodiment of the present invention.

FIG. 6 is an image processing apparatus 500 according to the second embodiment.

The image processing apparatus 500 has the same configuration as the image processing apparatus 300 shown in FIG. 3 (the configuration of the first embodiment), except that an identifying-vector setting circuit 501 is further provided.

In the image processing apparatus 500, components operating in the same manner as in the image processing apparatus 300 shown in FIG. 3 are indicated by the same reference numerals, and a further description thereof is omitted.

That is, in the image processing apparatus 500, identification conditions stored in advance in the motion-vector identification circuit 303 are arbitrarily set by the identifying-vector setting circuit 501.

Figure 7:
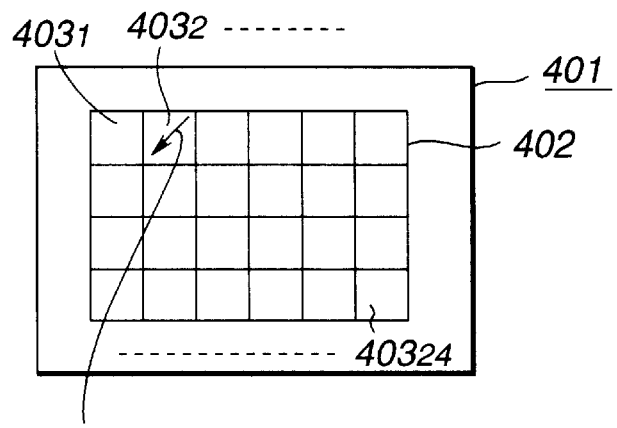
FIG. 7 is a diagram illustrating setting of a condition for identifying a motion vector in the second embodiment.

For example, as shown in FIG. 7, the identifying-vector setting circuit 501 sets an identification condition "a motion vector in the down leftward direction in the second block $403_2$ from the left end in the uppermost row (condition 4)" from among the plurality of detection blocks $403_1$, $403_2$, ..., $403_{24}$.

Accordingly, when the motion-vector identification circuit 303 identifies a motion vector satisfying the condition 4 from among motion vectors detected by the motion-vector detection circuit 302 with an identification condition arbitrarily set by the identifying-vector setting circuit 501, the circuit 303 supplies the image-processing control circuit 304 with an identifying signal.

As described above, in the second embodiment, by providing a configuration so that the identifying-vector setting circuit 501 can arbitrarily set an identification condition to be stored in the motion-vector identification circuit 303, the effect that the user can arbitrarily set fine identification conditions in accordance with situations can be obtained in addition to the effects obtained in the first embodiment.

Third Embodiment

Next, a third embodiment of the present invention is described.

Figure 8:
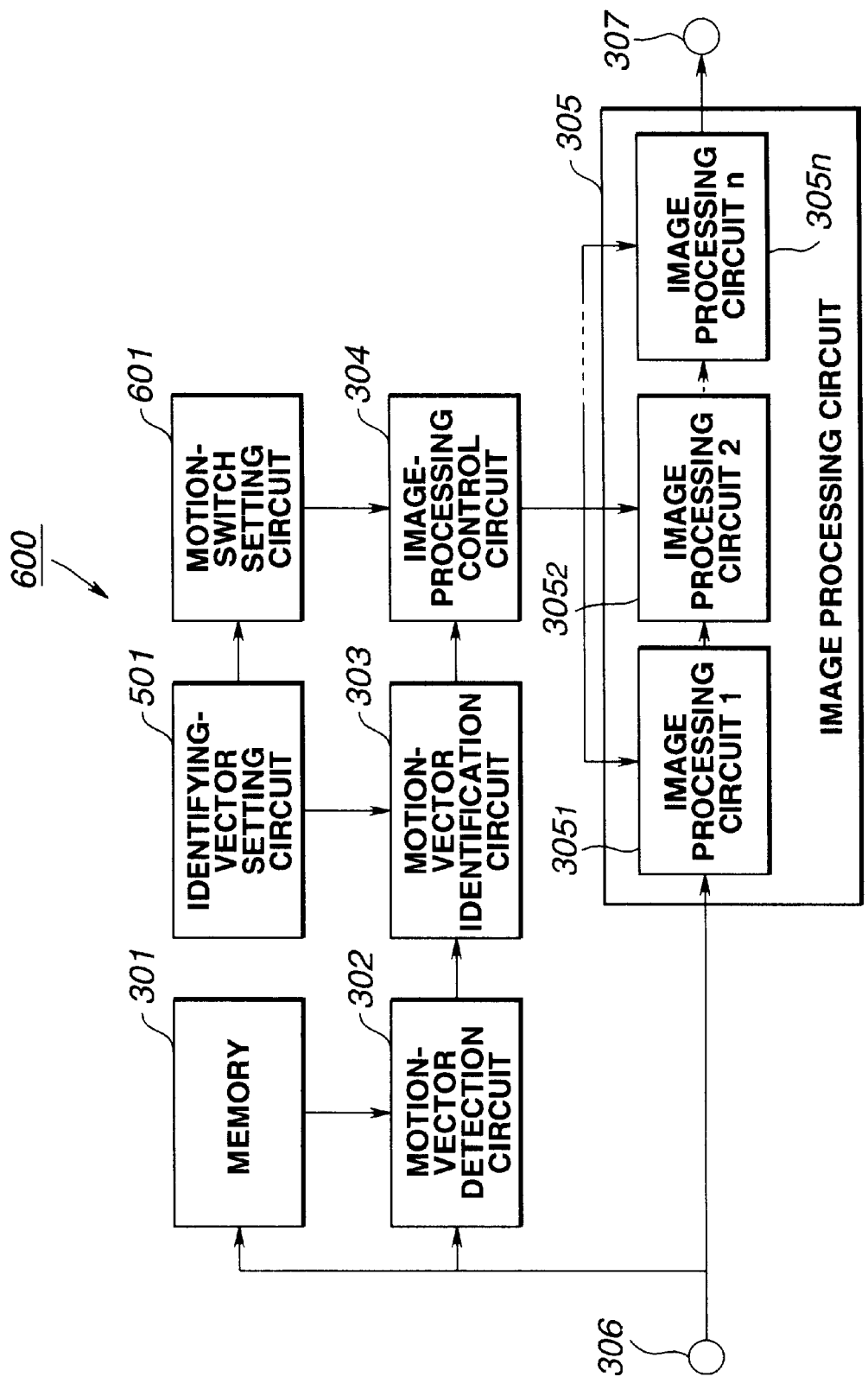
FIG. 8 is a block diagram illustrating the configuration of an image processing apparatus according to a third embodiment of the present invention.

FIG. 8 illustrates an image processing apparatus 600 according to the third embodiment.

The image processing apparatus 600 has the same configuration as the image processing apparatus 500 shown in FIG. 6 (the configuration of the second embodiment), except that a motion-switch setting circuit 601 is further provided, and that the image processing circuit 305 incorporates a plurality of image processing circuits $305_1$, $305_2$, ..., $305_n$.

The output of the identifying-vector setting circuit 501 is supplied to the motion-switch setting circuit 601, and the output of the motion-vector setting circuit 601 is supplied to the image-processing control circuit 304.

In the image processing apparatus 600 shown in FIG. 8, components operating in the same manner as in the image processing apparatus 500 shown in FIG. 6 are indicated by the same reference numerals, and a further description thereof is omitted.

That is, in the image processing apparatus 600, the motion-switch setting circuit 601 arbitrarily sets a type of image processing to be controlled in accordance with an identification condition set by the identifying-vector setting circuit 501.

Figure 9:
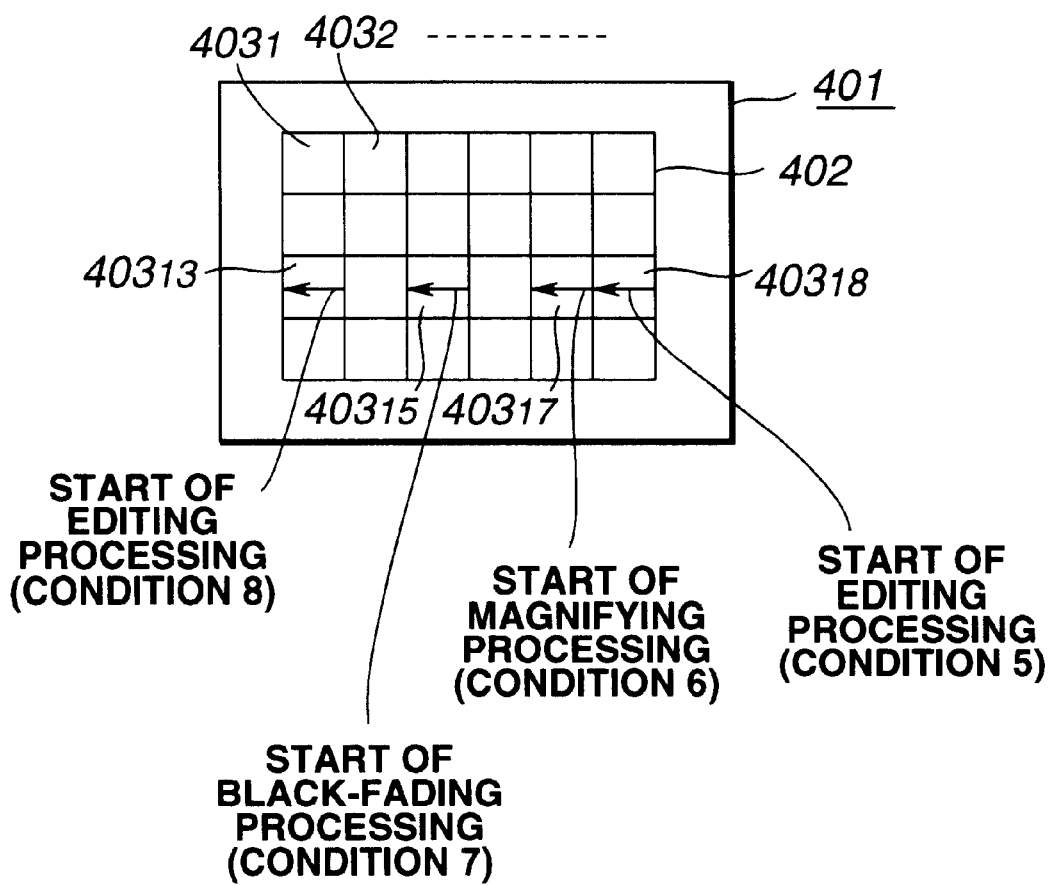
FIG. 9 is a diagram illustrating setting of image processing in accordance with motion vectors.

For example, as shown in FIG. 9, if identification conditions set by the identifying-vector setting circuit 501 are "a motion vector in the down leftward direction in the right end block $403_{18}$ from among the blocks $403_{13}$–$403_{18}$ in the third row from the uppermost row (condition 5)", "a motion vector in the leftward direction in the second block $403_{17}$ from the right end from among the blocks $403_{13}$–$403_{18}$ in the third row from the uppermost row (condition 6)", "a motion vector in the leftward direction in the fourth block $403_{15}$ in the blocks $403_{13}$–$403_{18}$ in the third row from the uppermost row (condition 7)", and "a motion vector in the leftward direction in the left end block $403_{13}$ from among the blocks $403_{13}$–$403_{18}$ in the third row from the uppermost row (condition 8)", the type of image processing to be controlled is set, such as editing start processing, magnifying processing, black-fading start processing, or editing end processing, when a motion vector satisfying the condition 5, the condition 6, the condition 7 or the condition 8 is detected, respectively.

Information set by the motion-switch setting circuit 601 is supplied to the image-processing control circuit 304.

The image-processing control circuit 304 recognizes image processing corresponding to each of the conditions 5–8 based on setting information from the motion-switch setting circuit 601. For example, when a motion vector satisfying the condition 5 is detected based on an identifying signal from the motion-vector identification circuit 303, the image-processing control circuit 304 supplies the image processing circuit 305 with a control signal indicating execution of editing-start processing by a processing circuit for performing editing-start processing from among the processing circuits $305_1$–$305_n$ of the image processing circuit 305.

Accordingly, the image processing circuit 305 starts editing processing by the processing circuit for performing editing-start processing in response to the control signal from the image-processing control circuit 304.

Similarly, when a motion vector satisfying the condition 6, 7 or 8 is detected, the image-processing control circuit 304 supplies the image processing circuit 305 with a control signal indicating execution of magnification-start processing, black-fading-start processing or an editing-end processing, respectively, based on an identifying signal from the motion-vector identification circuit 303. The image processing circuit 305 starts each image processing by a corresponding one of the processing circuits $305_1$–$305_n$ in response to the control signal from the image-processing control circuit 304.

As described above, in the third embodiment, by providing a configuration so that the motion-switch setting circuit 601 can set a type of image processing to be controlled, in accordance with an identification condition set by the identification-vector setting circuit 501, it is possible to obtain the effect that a motion vector can be identified with a fine condition arbitrary set by the user, and can be utilized as a switch for arbitrary image processing. As a result, it is possible to perform adaptive and high-function control for image processing.

Fourth Embodiment

Next, a fourth embodiment of the present invention is described.

FIG. 10 illustrates a video camera 700 according to the fourth embodiment. The image processing apparatus according to the present invention is applied to the video camera 700.

That is, as shown in FIG. 10, the video camera 700 includes an image pickup device 702 where light from an object (not shown) via a photographing lens 701 is focused, a sample-and-hold (S/H) circuit 703 where the output of the image pickup device 701 is supplied, an automatic gain control (AGC) circuit 704 where the output of the S/H circuit 703 is supplied, an analog-to-digital (A/D) conversion circuit 705 where the output of the AGC circuit 704 is supplied, a luminance signal/color signal (Y/C) separation circuit 706 where the output of the A/D conversion circuit 705 is supplied, a camera process circuit 707 where the output of the Y/C separation circuit 706 is supplied, a digital effect circuit 708 where the output of the camera process circuit 707 is supplied, a digital-to-analog (D/A) conversion circuit 709 where the output of the digital effect circuit 708 is supplied, and a recorder 710 and a display unit 711 where the output of the D/A conversion circuit 709 is supplied.

The video camera 700 has a configuration as shown in FIG. 6 (the configuration of the second embodiment). That is, the video camera 700 also includes a memory 301 and a motion-vector detection circuit 302 where the output of the camera process circuit 707 is supplied, a motion-vector identification circuit 303 where the output of the motion-vector detection circuit 302 is supplied, an image-processing control circuit 304 where the output of the motion-vector identification circuit 303 is supplied, an identifying-vector setting circuit 501 whose output is supplied to the motion-vector identification circuit 303, and an external switch 712 whose output is supplied to the image-processing control circuit 304. The output of the image-processing control circuit 304 is supplied to the image pickup device 702, the S/H circuit 703, the AGC circuit 704, the A/D conversion circuit 705, the Y/C separation circuit 706, the camera process circuit 707, the digital effect circuit 708, the D/A conversion circuit 709, the recorder 710 and the display 711.

In the video camera 700 shown in FIG. 10, components operating in the same manner as in the image processing apparatus 200 shown in FIG. 6 are indicated by the same reference numerals, and a further description thereof is omitted.

The light from the object is focused onto an image pickup surface of the image pickup device 702 by the photographic lens 701.

The image pickup device 702 comprises, for example, a CCD (charge coupled device), and converts the image of the object focused on the image pickup surface into an electrical signal and outputs the electrical signal.

The S/H circuit 703 samples the output signal from the image pickup device 703 and outputs the resultant signal to the AGC circuit 704. The AGC circuit 704 controls the gain of the output signal from the S/H circuit 703 and outputs the resultant signal to the A/D conversion circuit 705.

The A/D conversion circuit 705 digitizes the output signal from the AGC circuit 704 and outputs the resultant signal to the camera process circuit 707.

Although not illustrated, the Y/C separation circuit 706 has two 1H (horizontal synchronizing period) delay lines, and an adder for adding an input signal (the output signal from the A/D conversion circuit 705) and a 2H delay signal thereof. The addition output of the adder and the 1H delay signal are output as a color signal and a luminance signal, respectively.

The camera process circuit 707 performs edge emphasis processing and gamma correction processing for the output signal from the Y/C separation circuit 706 and outputs the resultant signal.

The output signal from the camera process signal 707 is supplied as an image effect signal to the digital effect circuit 708, the memory 301 and the motion-vector detection circuit 302.

The memory 301 stores the image signal from the camera process circuit 707. The motion-vector detection circuit 302 detects a motion vector indicating the direction and the magnitude of the movement of the object in the image in the above-described manner from the current image signal from the camera process circuit 707 and the previous frame of the image signal stored in the memory 301.

The motion-vector identification circuit 303 identifies a motion vector from the motion-vector detection circuit 302 with an identification condition preset by the identifying-vector setting circuit 501, and supplies the image-processing control circuit 304 with an identifying signal for the motion vector.

In response to the identifying signal from the motion-vector identification circuit 303, the image-processing control circuit 304 supplies the image pickup circuit 702, the S/H circuit 703, the AGC circuit 704, the A/D conversion circuit 705, the Y/C separation circuit 706, the camera process circuit 707, the digital effect circuit 708, the D/A conversion circuit 709, the recorder 710 and the display unit 711 with a control signal indicating that predetermined image processing is to be started, in accordance with the identification signal from the motion-vector identification circuit 303.

The image-processing control circuit 304 also supplies the above-described respective circuits with a control signal indicating that predetermined image processing is to be performed, in accordance with an output signal from the external switch 712 for providing the video camera 700 with a command to execute the predetermined image processing by the user.

Accordingly, each of the image pickup device 702, the S/H circuit 703, the AGC circuit 704, the A/D conversion circuit 705, the Y/C separation circuit 706, the camera process circuit 707, the digital effect circuit 708, the D/A conversion circuit 709, the recorder 710 and the display unit 711 operates in accordance with the control signal from the image-processing control circuit 304.

The digital effect circuit 708 includes a multiple-picture-frame processing circuit 708a, and a memory 708b where the output of the multiple-picture-frame processing circuit 708a is supplied. Although details are described later, the digital effect circuit 708 performs image processing for obtaining various kinds of special effects, such as electronic zooming, mosaic processing and the like, for the image signal from the camera process circuit 707.

The D/A conversion circuit 709 converts the output signal from the digital effect circuit 708 into an analog signal and outputs the resultant signal to the recorder 710 and the display unit 711.

The recorder 710 records the output signal from the D/A conversion circuit 709 in a recording medium (not shown).

The display unit 711 displays the output signal from the D/A conversion circuit 709 on its display screen.

The special effects to be realized by the digital effect circuit 408 in the video camera 700 are more specifically described with reference to FIGS. 11A–11C.

Figure 11A:
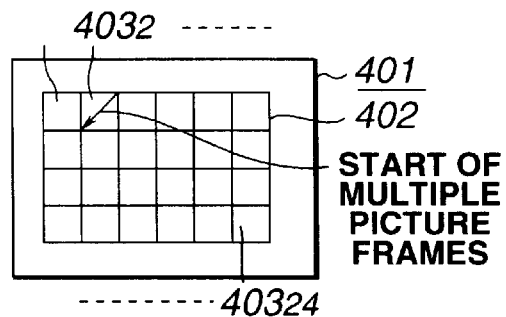
FIGS. 11A–11C are diagrams illustrating multiple-picture-frame processing.
Figure 11B:
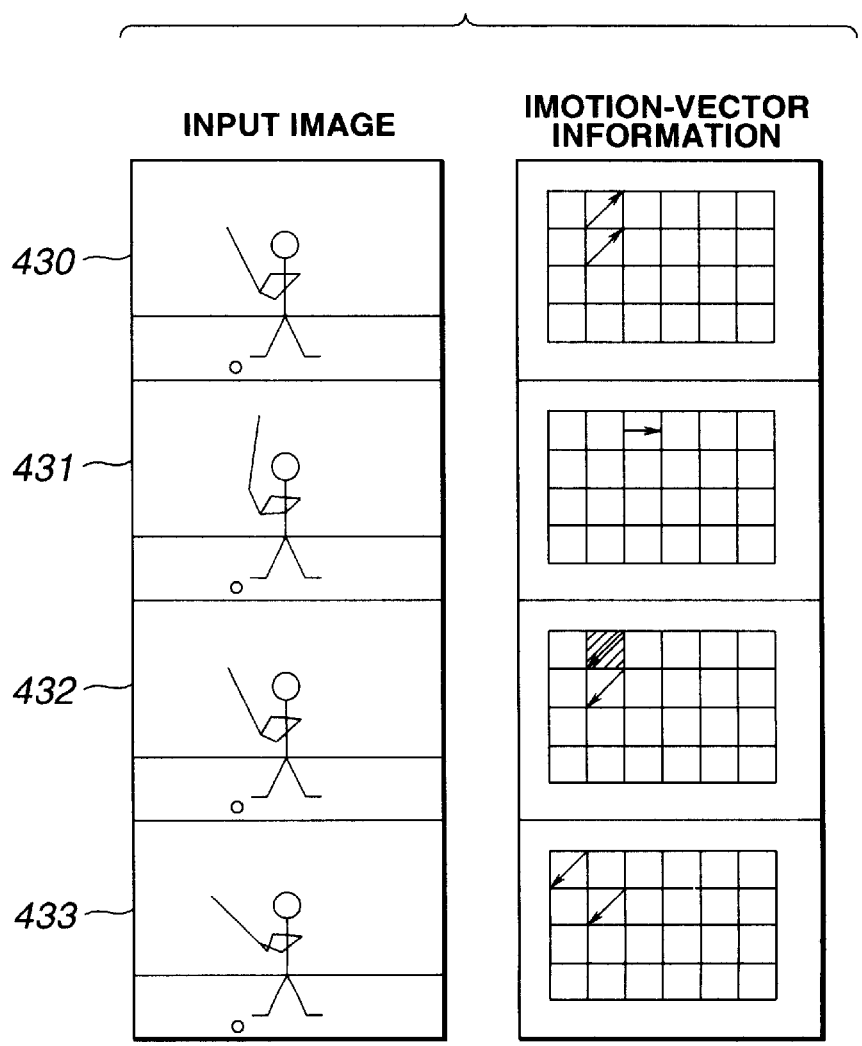
Figure 11C:
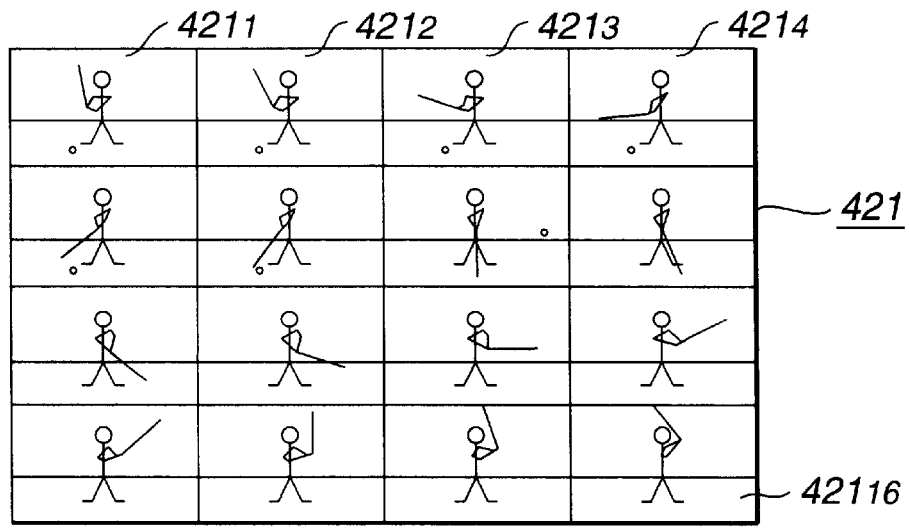

In multiple-picture-frame processing, as shown in FIG. 11C, a picture frame 421 is divided into a plurality of picture frames $421_1$–$421_{16}$, which are continuously displayed.

FIG. 11C illustrates multiple picture frames which continuously display states of a golf swing. Such multiple picture frames are used, for example, when a golf swing is photographed by a video camera in order to check the swing form.

Conventionally, in order to obtain multiple picture frames as the ones described above, the photographer starts video recording by operating an external switch of a video camera while estimating the timing of the golfer's swing.

However, since the golfer's swing is an instantaneous operation, it is very difficult to start video recording at the timing of the swing, and it is impossible to start video recording at a timing more precise than the response speed of the photographer.

Accordingly, in the video camera 700, for example, as shown in FIG. 11A, the identifying-vector setting circuit 501 sets an identification condition "a motion vector in the down leftward direction in the second block $403_2$ from the left end in the uppermost row (condition 9)" from among the plurality of detection blocks $403_1$, $403_2$, . . . , $403_{24}$.

When the identification condition 9 has been set by the identifying-vector setting circuit 501 and images shown in successive frames 430–433 of FIG. 11B are photographed and input, the motion-vector detection circuit 302 detects motion vectors in the sequentially input images shown in frames 430–433 of FIG. 11B.

The motion-vector identification circuit 303 identifies a motion vector satisfying the condition (9) from among the motion vectors detected by the motion-vector detection circuit 302.

In this case, since a motion vector shown in frame 432 of FIG. 11B satisfies the condition (9), the motion-vector identification circuit 303 supplies the image-processing control circuit 304 with an identifying signal when the motion vector shown in frame 432 of FIG. 11B is supplied.

When the identifying signal has been supplied from the motion-vector identification circuit 303, the image-processing control circuit 304 supplies the digital effect circuit 708 with a control signal indicating execution of multiple-picture-frame processing.

The digital effect circuit 708 performs multiple-picture-frame processing for the image signal from the camera process circuit 707 using the multiple-picture-frame processing circuit 708a and the memory 708b at the timing when the control signal from the image-processing control circuit 304 is supplied.

Accordingly, in the video camera 700, multiple-picture-frame processing is automatically performed at the timing when the image shown in frame 432 of FIG. 11B is input. Hence, the photographer does not to perform an operation to start video recording by estimating the timing of the golfer's timing as in the conventional approach, and it is possible to start video recording at a more precise timing than the response speed of the photographer.

As described above, in the fourth embodiment, by providing a configuration in which the image processing apparatus 500 shown in FIG. 6 (the configuration of the second embodiment) to the video camera 700, and the identifying-vector setting circuit 501 arbitrarily sets an identification condition to be stored in the motion-vector identification circuit 303, control of predetermined image processing is automatically performed at a timing more effective than when the photographer instructs execution of the predetermined image processing through the external switch 712, even when performing multiple-picture-frame processing which requires a precise photographing timing.

Fifth Embodiment

Next, a fifth embodiment of the present invention is described.

Figure 12:
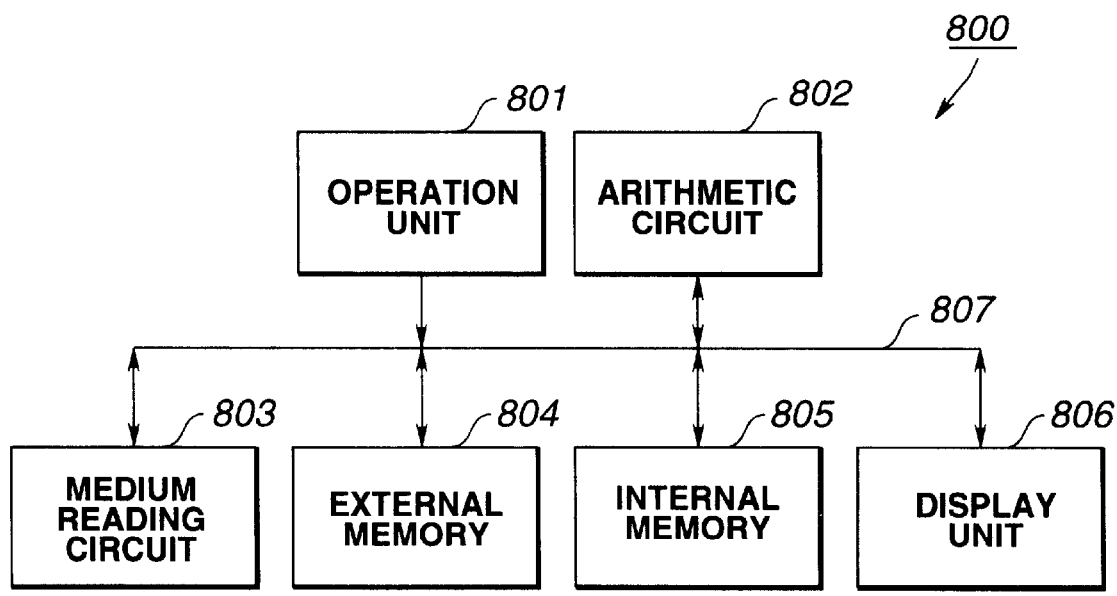
FIG. 12 is a block diagram illustrating the configuration of a video editing apparatus according to a fifth embodiment of the present invention.

FIG. 12 illustrates a video editing apparatus 800 according to the fifth embodiment. The image processing apparatus of the present invention is applied to the video editing apparatus 800.

That is, the video editing apparatus 800 comprises a computer. As shown in FIG. 12, an operation unit 801, an arithmetic circuit 802, a medium reading circuit 803, an external memory 804, an internal memory 805 and a display unit 806 are connected to one another via a bus 807 in order to exchange data.

The operation unit 801 includes a keyboard, a mouse and the like for providing the video editing apparatus 800 with various kinds of commands by the user, and has the functions of the identifying-vector setting circuit 501 and the motion-switch setting circuit 601 which are described above.

The arithmetic circuit 802 includes a CPU (central processing unit), a subprocessor and the like for performing various kinds of calculation processing, and has the functions of the motion-vector detection circuit 302, the motion-vector identification circuit 303, the image-processing control circuit 304 and the image processing circuit 305 which are described above.

The medium reading circuit 803 includes, for example, a CD(compact disc)-ROM(read-only memory) drive for reading various kinds of processing programs (software) from a storage medium, such as a CD-ROM or the like.

The external memory 804 includes, for example, a hard disk for storing various kinds of processing programs read by the medium reading circuit 803, various kinds of data necessary for executing these processing programs, and the like.

The internal memory 805 includes, for example, a buffer memory for appropriately storing processing programs to be executed and data necessary for various kinds of processing, and also has the function of the above-described memory 301.

The display unit 806 displays images and data processed by the arithmetic circuit 802.

Figure 13:
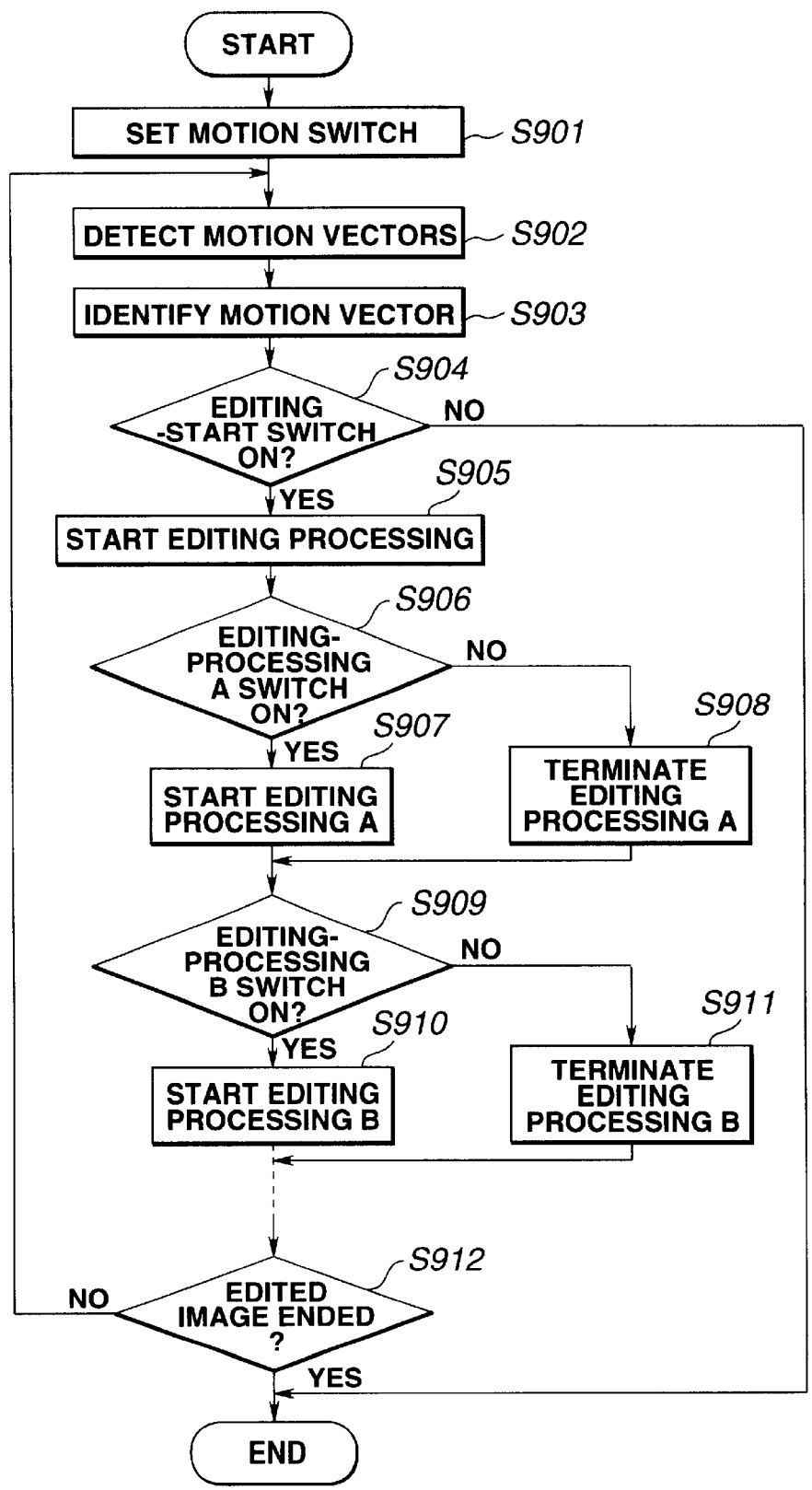
FIG. 13 is a flowchart illustrating the operation of the video editing apparatus shown in FIG. 12.

In the above-described video editing apparatus 800, for example, an editing-processing program represented by the flowchart shown in FIG. 13 is stored in advance in the external memory 804.

The editing-processing program also may be stored in advance in a storage medium (not shown), and may be read by the medium reading circuit 803 and may be stored in the external memory 804.

The storage medium according to the present invention is applied to the external memory 804 or the above-described storage medium storing the editing-processing program.

By reading the editing-processing program stored in the external memory 804 into the internal memory 805 and executing the editing-processing program by the arithmetic circuit 802, the video editing apparatus 800 operates in the following manner.

At this time, for example, it is assumed that image information (an image signal) to be edited is stored in advance in the external memory 804.

When the operation by the user is performed through the operation unit 801, the arithmetic circuit 802 reads the operational state of the operation unit 801, and recognizes if an instruction for performing setting of an identification condition by the identifying-vector setting circuit 501, and setting of a type of image processing to be controlled, by the motion-switch setting circuit 601, as described above, is provided. When such an instruction is provided, the arithmetic circuit 802 controls the display unit 807, for example, so as to display a setting picture frame shown in FIG. 14A.

Figure 14A:
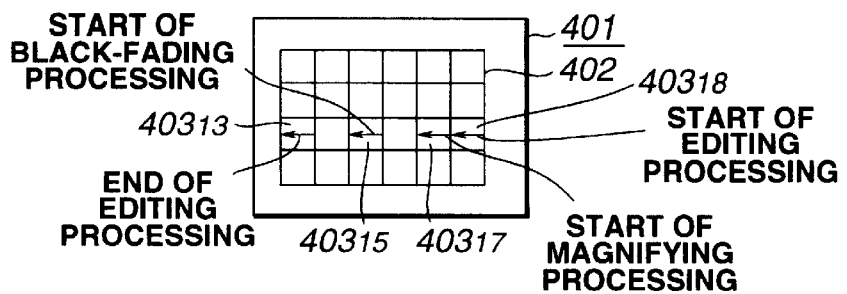
FIGS. 14A and 14B are diagrams illustrating editing processing in the video editing apparatus shown in FIG. 12.

The information of the setting picture frame shown in FIG. 14A is stored in advance in the external memory 804, and is read from the display unit 806 under the control of the arithmetic circuit 802 and is displayed on the picture frame.

When the setting picture frame has been displayed on the display unit 806, the user sets, using the operation unit 801, for example, identification conditions such as "a motion vector in the leftward direction in the right end block $403_{18}$ from among the blocks $403_{13}$–$403_{18}$ in the third row from the uppermost row (condition 10)", "a motion vector in the leftward direction in the second block $403_{17}$ from the right end block from among the blocks $403_{13}$–$403_{18}$ in the third row from the uppermost row (condition 11)", "a motion vector in the leftward direction in the fourth block $403_{15}$ from the right end block from among the blocks $403_{13}$–$403_{18}$ in the third row from the uppermost row (condition 12)", and "a motion vector in the leftward direction in the left end block $403_{13}$ from among the blocks $403_{13}$–$403_{18}$ in the third row from the uppermost row (condition 13)", as well as a type of image processing to be controlled, such as start of editing processing when a motion vector satisfying the condition 10 is detected, start of magnifying processing when a motion vector satisfying the condition 11 is detected, start of black-fading processing when a motion vector satisfying the condition 12 is detected, and end of editing processing when a motion vector satisfying the condition 13 is detected.

Such setting information is taken in by reading the operational state of the operation unit 801 by the arithmetic circuit 802, and is stored into the internal memory 805 (step S901).

Then, in the same manner as in the above-described processing performed by the motion-vector detection circuit 302, the arithmetic circuit 802 compares two consecutive image frames, from among image frames to be edited which are stored in the external memory 804, with each other, and detects a motion vector at each portion in the image using the difference obtained as a result of the comparison (step S902).

Then, in the same manner as in the above-described processing performed by the motion-vector identification circuit 303, the arithmetic circuit 802 compares the motion vector detected in step S902 with the identification condition set in step S901 in order to identify a pertinent motion vector.

When a pertinent motion vector is detected, the arithmetic circuit 802 stores information indicating execution of image processing corresponding to the detected motion vector into the internal memory 805 as on/off information for the switch (hereinafter termed "execution-switch information") (step S903).

For example, when a motion vector satisfying the condition 10 is detected, execution-switch information for editing processing within the internal memory 805 is switched to "on". When a motion vector satisfying the condition 11 is detected, execution-switch information for magnifying processing within the internal memory 805 is switched to "on". When a motion vector satisfying the condition 12 is detected, execution-switch information for black-fading processing within the internal memory 805 is switched to "on". When a motion vector satisfying the condition 13 is detected, execution-switch information for editing processing within the internal memory 805 is switched to "off".

Then, by referring to execution-switch information for each image processing stored in the internal memory 805 in step S904, the arithmetic circuit 802 determines if execution-switch information for editing processing is "on" (step S904). When the execution-switch information is switched from "off" to "on", editing processing is started (step S905). The process then proceeds to step S906.

On the other hand, when the execution-switch information is switched from "on" to "off", the process is terminated assuming that the editing processing is ended.

In step S906, as in the determination process in step S904, the arithmetic circuit 802 determines if execution-switch information for editing processing A (for example, magnifying processing in this case) is "on".

When the execution-switch information for the editing processing A is switched from "off" to "on" as a result of the determination in step S906, the arithmetic circuit 802 starts the editing processing A (step S907), and the process then proceeds to step S909.

On the other hand, when the execution-switch information for the editing processing A is switched from "on" to "off", the arithmetic circuit 802 terminates the editing processing A (step S908), and the process then proceeds to step S909.

In step S909, as in the same manner as in the determination processing in step S904, the arithmetic circuit 802 determines if execution-switch information for editing processing B (for example, black-fading processing in this case) is "on".

When the execution-switch information for the editing processing B is switched from "off" to "on" as a result of the determination in step S909, the arithmetic circuit 802 starts the editing processing B (step S910), and the process then proceeds to the next step (not shown, determination processing for another editing processing C or the like).

On the other hand, when the execution-switch information for the editing processing B is switched from "on" to "off", the arithmetic circuit 802 terminates the editing processing B (step S911), and the process then proceeds to the above-described next step.

After starting and ending processing according to the execution-switch information for the editing processing A, B, . . . in the above-described manner, the arithmetic circuit 802 determines if the edited image has been terminated (step S912).

If the result of the determination in step S912 is negative, the process returns to step S902, and the arithmetic circuit 802 repeats the above-described processing of steps S902–S911.

If the result of the determination in step S912 is affirmative, the arithmetic circuit 802 terminates the processing assuming that the editing processing is ended.

Figure 14B:
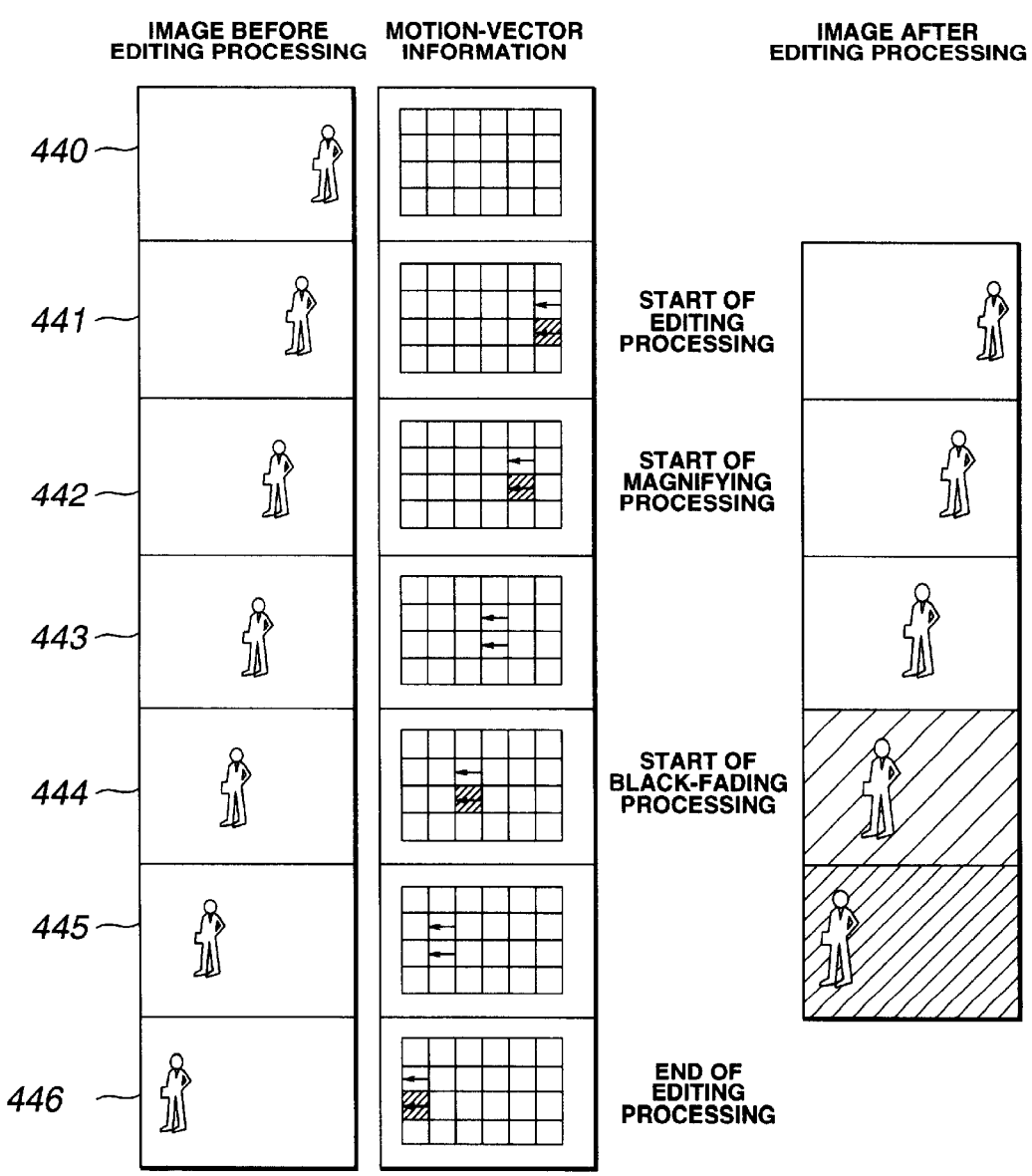

By executing the above-described editing processing to the continuous frames 440–446 of FIG. 14B motion vectors satisfying the conditions 10, 11, 12 and 13 are detected in the images shown in frames 441, 442, 444 and 446, respectively, of FIG. 14B and editing processing, magnifying processing and black-fading processing are started in images shown in frames 441, 442 and 444, respectively, of FIG. 14B and the editing processing is terminated in an image shown in frame 446 of FIG. 14B.

As described above, in the fifth embodiment, by providing a configuration such that a motion vector at each position (detection block) in an image to be edited is detected, the detected motion vector is identified using a fine identification condition arbitrarily set by the user, and the identified motion vector is utilized as a switch in editing processing, it is possible to automatically perform high-function editing processing, and to improve the operability.

The objects of the present invention may, of course, also be achieved by supplying a system or an apparatus with a storage medium, such as the external memory 804 or the like, storing program codes of software for realizing the functions of the host computer and the terminal of each of the above-described embodiments, and reading and executing the program codes stored in the storage medium by means of a computer (or a CPU or an MPU (microprocessor unit)) of the system or the apparatus.

In such a case, the program codes themselves read from the storage medium realize the functions of the above-described embodiments, so that the storage medium storing the program codes constitutes the present invention.

For example, a ROM, a RAM (random access memory), a floppy disk, a hard disk, an optical disk, a magnetooptical disk, a CD-ROM, a CD-R (recordable), a magnetic tape, a non-volatile memory card or the like may be used as the storage medium for supplying the program codes.

The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

The present invention may be applied to an apparatus comprising a single unit as shown in FIGS. 1, 4, 6, 8 and 10, or to a system comprising a plurality of apparatuses.

As described above, according to the embodiments, a result of identification of a motion vector satisfying a predetermined identification condition is utilized as a switching function for start, end or the like of image processing. Hence, by finely setting the predetermined identification condition according to the position, the magnitude, the direction and the like of a motion vector, image processing is more finely controlled. Accordingly, control for image processing is performed with a higher function than in the conventional control for image processing based on the presence/absence of a motion vector.

Furthermore, the user can arbitrarily set a predetermined identification condition in accordance with the situation. Hence, it is possible to control image processing with a higher function.

According to the above-described embodiments, the user can arbitrarily set a type of predetermined image processing in accordance with the situation, such as performing image processing A when a motion vector satisfying an identification condition A is identified, and performing image processing B when a motion vector satisfying an identification condition B is identified. Hence, it is possible to control image processing with a higher function.

According to the above-described embodiments, image processing in a video camera are automatically controlled using motion vectors of an object in a photographed image. It is thereby possible to instruct start or the like of image processing at a timing more effective than in the conventional approach in which the user manually instructs the start or the like of image processing through an external switch. Hence, it is possible to provide a video camera which controls image processing with a high function.

According to the above-described embodiments, it is possible to automatically control a large number of image processing operations, or the like in a video editing apparatus using motion vectors in an image to be edited. It is thereby possible to more simply perform editing processing than when the user performs editing processing by manually instructing the start or the like of image processing through an external switch. Hence, it is possible to provide a video editing apparatus which controls image processing with a high function.

According to the above-described embodiments, it is possible to automatically control image processing in a general-purpose computer using motion vectors of an object in an input image. It is thereby possible to improve the operability. Hence, it is possible to provide a system or an apparatus which controls image processing with a high function.

The individual components shown in outline or designated by blocks in the drawings are all well-known in the image processing apparatus and method art and their specific construction and operation are not critical to the operation or the best mode for carrying out the invention.

The foregoing description of the embodiments is given for illustrative purposes only and is not to be construed as imposing any limitation in any respect.

The scope of the invention is, therefore, to be determined solely by the following claims and not is limited by the text of the specification and changes made within a scope equivalent to the scope of the claims fall within the true spirit and scope of the invention.

What is claimed is:

1. An image processing apparatus comprising:

an input unit, arranged to input an image signal which corresponds to a scene;

a detector, arranged to detect motion vectors of an object from the image signal;

a setting unit, arranged to arbitrarily set a condition for identifying a motion vector, wherein the condition is set independent of the output of said detector, and wherein the condition includes at least a designated position on the scene;

an identification unit, arranged to identify a motion vector which satisfies the condition set by said setting unit from among the motion vectors detected by said detector, wherein the condition is satisfied if a motion vector is detected in the designated position; and an image processor, arranged to perform predetermined processing on the image signal in accordance with an identification by said identification unit of a motion vector which satisfies the condition.

2. An apparatus according to claim 1, wherein said setting unit sets a plurality of conditions, and wherein said image processor processes a plurality of kinds of image processing in accordance with the set conditions.

3. An apparatus according to claim 1, wherein the predetermined processing comprises magnifying an image.

4. An apparatus according to claim 1, wherein the predetermined processing comprises fading processing.

5. An apparatus according to claim 1, wherein the predetermined processing comprises displaying multiple picture frames.

6. An apparatus according to claim 1, wherein said input unit comprises an image pickup unit, arranged to convert an optical image into an electric signal and output as an image signal.

7. An apparatus according to claim 1, further comprising:
 a recording unit, arranged to record on a recording medium the image signal processed by said image processing unit.

8. An image processing method comprising the steps of:
 inputting an image signal which corresponds to a scene;
 detecting motion vectors of an object from the input image signal;
 arbitrarily setting a condition for identifying a motion vector, wherein the condition is set independent of the output of said detecting step, and wherein the condition includes at least a designated position on the scene
 identifying a motion vector which satisfies the condition set by said setting step from among the detected motion vectors, wherein the condition is satisfied if a motion vector is detected in the designated position; and
 performing predetermined processing on the input image signal in accordance with an identification of a motion vector which satisfies the condition.

9. A computer readable recording medium on which program codes of an image processing program are recorded, said recording medium including recorded program codes for controlling image processing comprising the steps of:
 an input step, of inputting an image signal which corresponds to a scene;
 a detection step, of detecting motion vectors of an object from the input image signal;
 a setting step, of arbitrarily setting a condition for identifying a motion vector, wherein the condition is set independent of the output of said detection step, and wherein the condition includes at least a designated position on the scene;
 an identification step, of identifying a motion vector which satisfies the condition set by said setting step from among the motion vectors detected in said detection step, wherein the condition is satisfied if a motion vector is detected in the designated position; and
 an image processing step, of performing predetermined processing of the input image signal in accordance with an identification by said identification step of a motion vector which satisfies the condition.

* * * * *

UNITED STATES PATENT AND TRADEMARK OFFICE
CERTIFICATE OF CORRECTION

PATENT NO.     : 6,735,250 B2
DATED          : May 11, 2004
INVENTOR(S)    : Kazuya Inou It is certified that error appears in the above-identified patent and that said Letters Patent is hereby corrected as shown below:

<u>Title page,</u>
Item [57], ABSTRACT,
Line 2, "precessing," should read -- processing, --.

<u>Drawings,</u>
Sheet 9, Figure 11B, "1MOTION-VECTOR" should read -- MOTION-VECTOR --.

<u>Column 4,</u>
Line 53, "frame 28 of in" should read -- in frame 28 of --.

<u>Column 7,</u>
Line 5, "arbitrary" should read -- arbitrarily --.

<u>Column 9,</u>
Line 60, "does not" should read -- does not need --.

<u>Column 14,</u>
Lines 7 and 36, "are" should read -- is --;
Line 41, "not is" should read -- is not --;
Line 66, "wherein said setting" should be deleted ; and
Line 67, "unit sets a plurality of conditions, and" should be deleted.

<u>Column 15,</u>
Line 12, "output" should read -- output the electric signal --;
Line 17, "processing unit." should read -- processor. --; and
Line 25, "scene" should read -- scene; --.

Signed and Sealed this

Eighteenth Day of October, 2005

JON W. DUDAS
*Director of the United States Patent and Trademark Office*